US012080076B2

(12) United States Patent
Guibbert

(10) Patent No.: US 12,080,076 B2
(45) Date of Patent: Sep. 3, 2024

(54) CONTROL SYSTEM FOR A VEHICLE DISPLAY OF INDICATION OF ROAD TRAFFIC SIGN

(71) Applicant: JAGUAR LAND ROVER LIMITED, Warwickshire (GB)

(72) Inventor: Mickael Guibbert, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 482 days.

(21) Appl. No.: 17/421,591

(22) PCT Filed: Jan. 8, 2020

(86) PCT No.: PCT/EP2020/050262
§ 371 (c)(1),
(2) Date: Jul. 8, 2021

(87) PCT Pub. No.: WO2020/144204
PCT Pub. Date: Jul. 16, 2020

(65) Prior Publication Data
US 2022/0122364 A1 Apr. 21, 2022

(30) Foreign Application Priority Data
Jan. 9, 2019 (GB) ..................................... 1900278

(51) Int. Cl.
*G06V 20/58* (2022.01)
*B60W 40/105* (2012.01)
*B60W 50/14* (2020.01)

(52) U.S. Cl.
CPC ......... *G06V 20/582* (2022.01); *B60W 40/105* (2013.01); *B60W 50/14* (2013.01); *B60W 2050/146* (2013.01); *B60W 2420/403* (2013.01)

(58) Field of Classification Search
None
See application file for complete search history.

(56) References Cited

U.S. PATENT DOCUMENTS 6,560,529 B1    5/2003  Janssen
9,715,827 B2 *  7/2017  Ng .................. G08G 1/0175
(Continued)

FOREIGN PATENT DOCUMENTS

CN          102568236 A      7/2012
DE       102007005245 A1    11/2007
(Continued)

OTHER PUBLICATIONS

Combined Search and Examination Report under Sections 17 and 18(3) for Application No. GB1900278.1 dated Jul. 4, 2019.
(Continued)

*Primary Examiner* — Tahmina N Ansari
(74) *Attorney, Agent, or Firm* — Carlson, Gaskey & Olds, P.C.

(57) ABSTRACT

Aspects of the present invention relate to a control system and method for a vehicle. The control system receives vision road traffic sign data from a vision subsystem of the vehicle, and receives navigation road traffic sign data from a navigation subsystem of the vehicle. The control system determines a characteristic of a detected road traffic sign, for example whether the detected road traffic sign is permanent or temporary by nature, or whether advance notification of the detected road traffic sign is needed, in the vicinity of the vehicle. The detected road traffic sign is included in at least one of the received vision road traffic sign data and the received navigation road traffic sign data. The control system determines whether to output an indication of the detected road traffic sign in dependence on the determined characteristic and in dependence on whether the detected road traffic sign is included in: the vision road traffic sign
(Continued)

data; the navigation road traffic sign data; or, both the vision road traffic sign data and the navigation road traffic sign data.

14 Claims, 2 Drawing Sheets

(56) References Cited

U.S. PATENT DOCUMENTS

| | | | |
|---|---|---|---|
| 10,354,156 B2 * | 7/2019 | Nishimura | G06V 20/582 |
| 10,657,732 B2 * | 5/2020 | Wang | G08G 1/143 |
| 10,778,962 B2 * | 9/2020 | Ng | H04N 13/307 |
| 2009/0088978 A1 * | 4/2009 | Ishikawa | G08G 1/096725 |
| | | | 701/514 |
| 2010/0188288 A1 | 7/2010 | Bahlmann et al. | |
| 2012/0150428 A1 | 6/2012 | Niem et al. | |
| 2012/0303222 A1 * | 11/2012 | Cooprider | B60W 10/06 |
| | | | 701/409 |
| 2016/0117923 A1 | 4/2016 | Dannenbring | |
| 2016/0275792 A1 | 9/2016 | Takiguchi et al. | |
| 2017/0010117 A1 | 1/2017 | Oh | |
| 2017/0092125 A1 | 3/2017 | Fujimaki | |
| 2017/0148320 A1 | 5/2017 | Ro | |
| 2017/0178591 A1 * | 6/2017 | Takatsudo | B60R 1/00 |
| 2017/0349097 A1 * | 12/2017 | Nishimura | G06V 20/582 |

FOREIGN PATENT DOCUMENTS

| | | |
|---|---|---|
| EP | 1503354 A1 | 2/2005 |
| WO | 2018/118057 A1 | 6/2018 |

OTHER PUBLICATIONS

International Search Report and Written Opinion of the International Searching Authority for International application No. PCT/EP2020/050262 dated Apr. 28, 2020.
CN20208000881309, First office action dated Jul. 19, 2022.

* cited by examiner

CONTROL SYSTEM FOR A VEHICLE DISPLAY OF INDICATION OF ROAD TRAFFIC SIGN

TECHNICAL FIELD

The present disclosure relates to a control system for a vehicle and, in particular, a control system for determining whether and when to output an indication of a detected road traffic sign in the vicinity of the vehicle. Aspects of the invention relate to a control system, to a method, to a storage medium, and to a vehicle.

BACKGROUND

It is known for a road vehicle, for example a car, to have one or more forward-facing cameras to gather data relating to the road being travelled by the vehicle. In particular, the forward-facing cameras may be used to gather data relating to road traffic signs on or beside the road along which the vehicle is travelling. The gathered data may be processed by an on-board image processing subsystem to determine the information being displayed by the traffic sign, and then the determined information may be relayed to the vehicle driver, for example by displaying the information on a dashboard display of the vehicle.

The use of forward-facing cameras for this purpose is disadvantageous in that the cameras may not detect certain road signs or the image processing subsystem may make an incorrect determination that a certain road sign is present based on the gathered data. This may occur, for example, if a given road sign is tilted, dirty, or partially covered by trees or bushes. Such issues may also cause a traffic sign to be displayed to the vehicle driver later than is preferable for them to be able to react appropriately to the information on the traffic sign. Also, forward-facing cameras have a limited detection range.

It is also known to use a navigation subsystem of a vehicle to determine a speed limit to which the vehicle should be adhering. In particular, this is achieved by determining the road along which the vehicle is currently travelling and retrieving the speed limit associated with the determined road or section of road. The determined speed limit may also be displayed to the driver on the dashboard display.

This may be disadvantageous in that the speed limit associated with a particular road along which the vehicle travels may be unavailable or missing, or the information retrieved by the navigation subsystem may be out of date.

It is an aim of the present invention to address one or more of the disadvantages associated with the prior art.

SUMMARY OF THE INVENTION

According to an aspect of the present invention there is provided a control system for a vehicle. The control system may comprise one or more controllers. The control system may be configured to receive vision road traffic sign data from a vision subsystem of the vehicle. The control system may be configured to receive navigation road traffic sign data from a navigation subsystem of the vehicle. The control system may be configured to determine a characteristic of a detected road traffic sign in the vicinity of the vehicle, the detected road traffic sign being included in at least one of the received vision road traffic sign data and the received navigation road traffic sign data. The control system may be configured to determine whether to output an indication of the detected road traffic sign in dependence on the determined characteristic and in dependence on whether the detected road traffic sign is included in: the vision road traffic sign data; the navigation road traffic sign data; or, both the vision road traffic sign data and the navigation road traffic sign data.

The present invention is advantageous in that it provides control logic to fuse data received from two separate sources, namely, the vision subsystem and the navigation subsystem, to increase the accuracy of detecting road traffic signs in the vicinity of the vehicle. In particular, the present invention reduces the number of signs that are not detected but are present in the vicinity ('false negatives'), reduces the number of signs that are detected too late ('late positives'), and reduces the number of signs that are detected but are not present in the vicinity ('false positives'). Specifically, the present invention improves on the prior art systems in which the false negative rate is typically 5-10%, and the false positive rate is typically 0.5-1 sign per 100 kilometres. The control system informs the vehicle driver and/or one or more other vehicle subsystems detected road traffic signs with greater accuracy as a constant reminder of previous or upcoming hazard areas signalled by physical traffic signs on the road.

The control system may comprise an electronic control unit or one or more controllers. For example, said control system may comprise an electronic processor having an electrical input for receiving an electronic signal from the vision subsystem and the navigation subsystem. The electronic controller, or the one or more controllers may have, associated therewith, micro-processors programmed to execute the required functions. For example, the system may comprise an electronic memory device electrically coupled to the electronic processor and having instructions stored therein. The control system configured to determine a characteristic of a detected road traffic sign in the vicinity of the vehicle may comprise the processor being configured to access the memory device and execute the instructions stored therein such that it is operable to determine the characteristic of the detected road traffic based on at least one of the received vision road traffic sign data and the received navigation road traffic sign data.

In addition the electronic controller, or the one or more controller, may have an internal, or associated external, memory means, for example a solid state memory device. It will be appreciated that all the functional "means" referred to throughout this document may be considered as control functions within one or more electronic control units or controllers.

The control system may be configured to determine a plurality of characteristics of the detected road traffic sign.

The characteristic may be that the detected road traffic sign is either permanent or temporary.

If the detected road traffic sign is permanent and included in both the vision road traffic sign data and the navigation road traffic sign data, then the control system may be configured to output the indication of the detected road traffic sign.

If the detected road traffic sign is permanent and included in the vision road traffic sign data only, then the control system may configured to determine whether the navigation subsystem has access to data indicative of the detected road traffic sign, and, if not, output the indication of the detected road traffic sign.

If the detected road traffic sign is temporary and included in the vision road traffic sign data, then the control system may be configured to output the indication of the detected road traffic sign.

The characteristic may be permanent if the detected road traffic sign is any one of:
- a stop sign;
- a yield sign;
- a no entry sign;
- a no motor vehicle sign;
- a wild animal sign;
- a cyclist sign;
- a pedestrian sign;
- a children sign;
- a sharp bend left or right sign;
- a double bend left or right sign; and,
- a junction with or without priority sign.

The characteristic may be temporary if the detected road traffic sign is any one of:
- a slippery road sign;
- a queues sign;
- a road narrows both directions sign;
- a road narrows left or right sign; and,
- a construction sign.

The characteristic may be whether advance notification of the detected road traffic sign is needed.

If advance notification of the detected road traffic sign is needed and the detected road traffic sign is included in the navigation road traffic sign data, then the control system may be configured to output the indication of the detected road traffic sign.

The control system may be configured to determine that advance notification is needed if the indication of the detected road traffic sign needs to be output when a distance between the vehicle and the detected road traffic sign is greater than a threshold value.

A detection range of the vision subsystem may be less than or equal to the threshold value.

The control system may be configured to determine that advance notification of the detected road traffic sign is needed if the detected road traffic sign is any one of:
- a stop sign;
- a yield sign;
- a pedestrian sign; and,
- a children sign.

The vicinity of the vehicle may include along a road being travelled by the vehicle.

The vicinity of the vehicle may include a direction ahead of the vehicle.

The control system may be configured to output the indication of the detected road traffic sign to a driver of the vehicle.

The control system may be configured to cause the indication of the detected road traffic sign to be displayed for a specified distance of travel of the vehicle.

The control system may comprise display apparatus in a cabin of the vehicle. The control system may be configured to output the indication of the detected road traffic sign from the one or more controllers to the display apparatus. The display apparatus may be configured to display the indication of the detected road traffic sign to the driver.

The display apparatus may be an instrument display panel and/or a header display (a 'Head-Up Display') of the vehicle.

The display apparatus may be configured to display the indication of the detected road traffic sign for a specified distance of travel of the vehicle.

The specified distance of travel may be dependent on the detected road traffic sign.

The display apparatus may be configured to display the indication of the detected road traffic sign until the vehicle has passed the detected road traffic sign.

The control system may comprise the vision subsystem. The vision subsystem may comprise at least one vehicle-mounted forward-looking camera configured to receive image data of the detected road traffic sign.

The vision subsystem may comprise an image processing unit configured to extract one or more features of the detected road traffic sign from the received image data for sending to the one or more controllers.

The control system may comprise the navigation subsystem. The navigation subsystem may comprise a telematics control unit of the vehicle.

According to another aspect of the invention there is provided a method for a vehicle. The method may comprise receiving vision road traffic sign data from a vision subsystem of the vehicle. The method may comprise receiving navigation road traffic sign data from a navigation subsystem of the vehicle. The method may comprise determining a characteristic of a detected road traffic sign in the vicinity of the vehicle, the detected road traffic sign being included in at least one of the received vision road traffic sign data and the received navigation road traffic sign data. The method may comprise determining whether to output an indication of the detected road traffic sign in dependence on the determined characteristic and in dependence on whether the detected road traffic sign is included in: the vision road traffic sign data; the navigation road traffic sign data; or, both the vision road traffic sign data and the navigation road traffic sign data.

According to another aspect of the invention there is provided a non-transitory, computer-readable storage medium storing instructions thereon that when executed by one or more electronic processors causes the one or more electronic processors to perform the method described above.

According to another aspect of the invention there is provided a vehicle comprising a control system as described above.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

The present invention provides a vehicle control system and method for detecting and informing the driver of one or more road traffic signs along a road being, or to be, travelled by the vehicle. In particular, data relating to the road traffic signs is gathered from both a vision subsystem of the vehicle and a navigation subsystem of the vehicle, and fusion of the two sets of gathered data allows a determination as to what information to relay to the driver. This fusion of data improves the accuracy and completeness of the information being relayed to the driver.

Figure 1:
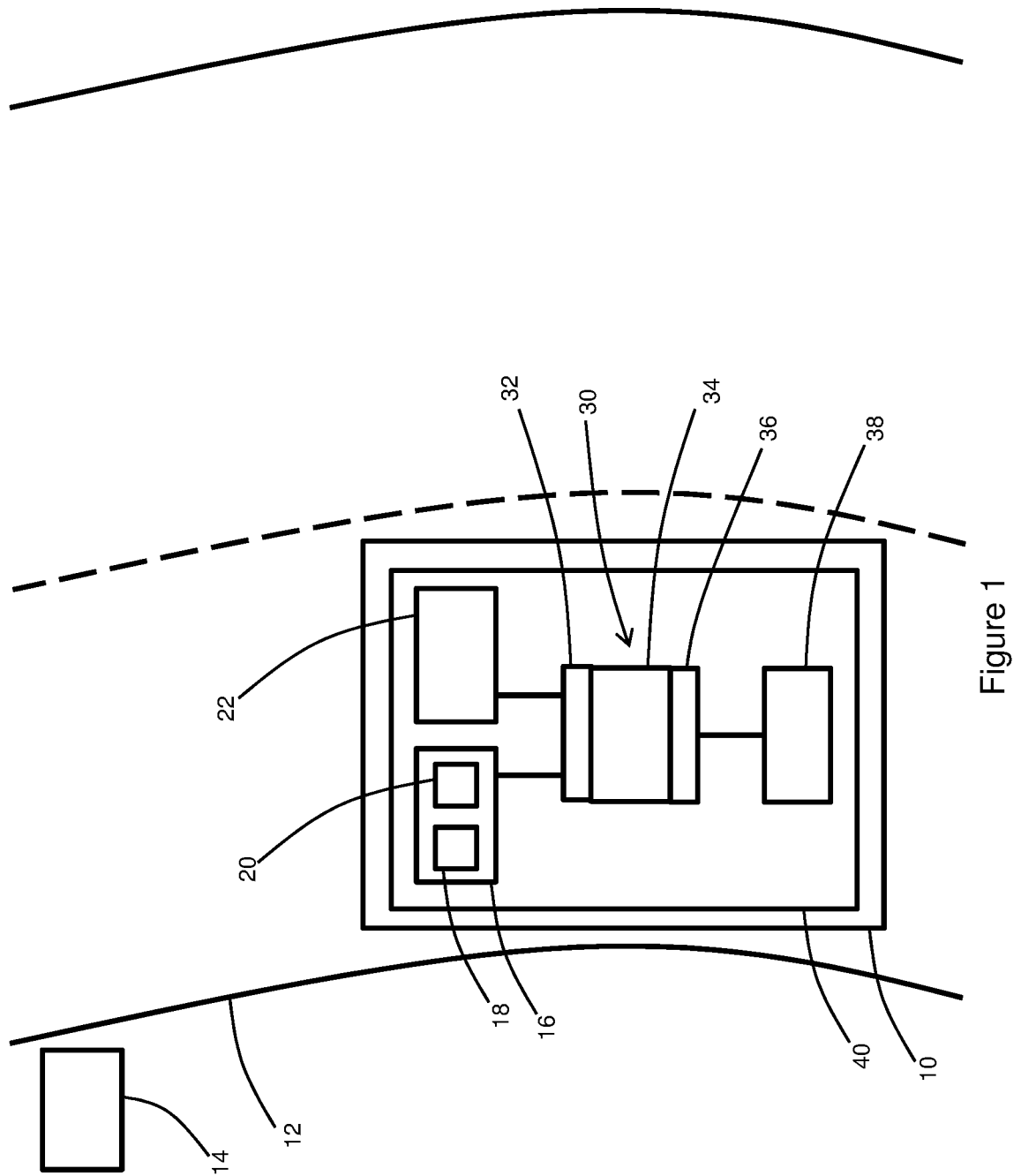
FIG. 1 shows a schematic plan view of a vehicle travelling along a road and a traffic sign ahead of the vehicle at the side of the road, the vehicle including a control system according to an aspect of the invention; and, FIG. 2 illustrates the steps of a method performed by the control system of FIG. 1.

FIG. 1 shows a vehicle 10 travelling along a road 12. Ahead of the vehicle 10 and beside the road 12 is a road traffic sign 14 displaying information to the driver of the vehicle, discussed in greater detail below.

The vehicle 10 includes a vision subsystem 16 which in turn includes one or more cameras 18 mounted on the vehicle 10. The cameras 18 are forward-facing and mounted at the front of the vehicle 10. The cameras 18 are configured to gather image data of the surroundings of the vehicle 10, in particular ahead of the vehicle 10. Specifically, the cameras 18 detect image data associated with the road traffic sign 14 as the vehicle 10 approaches the traffic sign 14. The vision subsystem 16 also includes an image processing unit 20 configured to process and analyse the image data gathered and collected by the cameras 18. In particular, the image processing unit 20 extracts one or more features of the road traffic sign 14 in order to determine which specific type of road traffic sign it is. The image processing unit 20 may use character recognition and/or determine the overall shape of the detected traffic sign 14 in order to determine the specific type of road sign and therefore the information that is being imparted to the driver.

The vehicle 10 also includes a navigation subsystem 22 which includes satellite navigational apparatus such as a Global Positioning System (GPS) configured to determine the geographical location of the vehicle 10 and, in particular, the road 12 along which the vehicle 10 travelling. The navigation subsystem 22 includes map data including information about the road 12 along which the vehicle 10 is travelling, such as the speed limit of the road 12, hazards associated with the road, and upcoming junctions. Specifically, the map data includes information about various road traffic signs, including the traffic sign 14, positioned along the road 12. The navigation subsystem 22 may be part of a telematics control unit of the vehicle 10.

The vehicle 10 also includes a controller 30 having an input 32, one or more processors 34, and an output 36. The input 32 is configured to receive vision data from the vision subsystem 16 and, in particular, data indicative of the road traffic sign 14 such as the one or more features of the sign 14 extracted by the image processing unit 20. The input 32 is also configured to receive navigation or map data from the navigation subsystem 22 and, in particular, data indicative of road traffic signs in the determined geographical vicinity of the vehicle 10. The processor 34 is configured to determine whether information provided by the road traffic signs detected by the vision and/or navigational subsystems 16, 22 is to be brought to the attention of the driver, as is discussed in greater detail below. When it is determined that the driver is to be informed of the presence of the detected road sign 14 the output 36 is configured to transmit an indication to one or more further subsystems or apparatus of the vehicle 10 to inform the driver as such.

The vehicle 10 also includes display apparatus 38 in a cabin of the vehicle 10 in the form of an instrument display panel and/or header display (a 'Head-Up Display'). The display apparatus 38 is configured to display an indication of the information provided by a detected road traffic sign, for example in the form of an icon replicating the sign, in dependence on the received signal from the output 36.

The vision subsystem 16, navigation subsystem 22, controller 30 and display apparatus 38 may be considered to form a control system 40 of the vehicle. Alternatively, one or more of these components, but including the controller 30, may be considered to form the control system 40. The control system 40 may include one or more controllers to provide the functionality of the controller 30 described herein.

Figure 2:
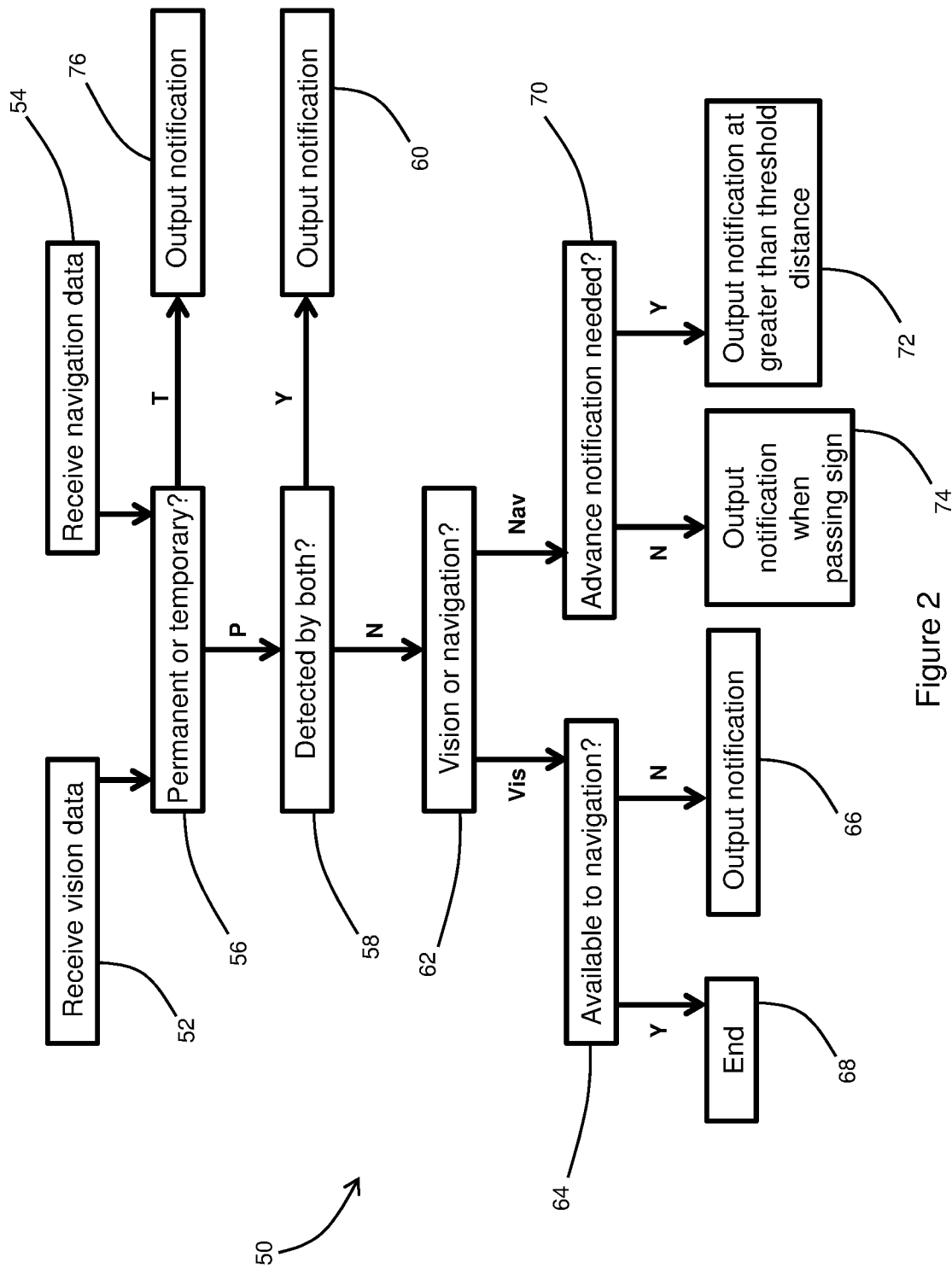

FIG. 2 shows the steps of a method 50 performed by the controller 30 and other vehicle subsystems as the vehicle 10 travels along the road 12. The forward-facing cameras 18 continuously gather image data of the vehicle surroundings as the vehicle 10 travels along the road 12, and the image data is analysed by the image processing unit 20. Typically, the cameras 18 have a range of approximately 30 metres. Once the image processing unit 20 has determined the presence of any road traffic signs by extracting features from the collected image data, information as to the presence of these determined road signs are sent to the controller 30 and, in particular, this vision road traffic sign data indicative of at least one road traffic sign is received by the input 32 at step 52 of the method 50.

Similarly, the navigation subsystem 22 continuously tracks the location of the vehicle 10 and, in particular, the specific location of the vehicle 10 along the road. The navigation subsystem 22 retrieves information relating to road traffic signs (or other limitations/rules) in the vicinity of the determined location of the vehicle 10, such as along the road 12. Specifically, data indicative of the type of detected road traffic sign, and possibly its position relative to the vehicle 10, is received by the input 32 at step 54 of the method 50.

The processor 34 analyses a detected road traffic sign 14 included in either or both of the vision road traffic sign data from the vision subsystem 16 and the navigation road traffic sign data from the navigation subsystem 22. In particular, the processor 34 determines one or more characteristics of the detected road traffic sign 14.

In the present context, one of the characteristics of the detected road sign 14 determined by the processor 34 is whether it is a so-called 'permanent' sign or a 'temporary' sign. A permanent sign may be regarded as a sign that is permanently present in its position at a roadside. In contrast, a temporary sign is a sign that is only present in its detected position for a limited period of time, for example during a period of construction works on or near the road 12. At step 56, the processor 34 makes a determination as to whether the detected road sign is permanent or temporary. The processor 34 may use different features of the detected road sign in order to determine whether it is permanent or temporary, for example by analysing its position and height relative to the road, its overall size and/or shape, and/or its tilt relative to the road surface.

If the detected road traffic sign detected by the vision subsystem 16 is classified as permanent in step 56, then at step 58 the processor 34 checks whether both of the received vision and navigation road traffic sign data includes the detected road traffic sign 14.

Examples of types of road traffic sign that may be classified as permanent in nature are a stop sign, a yield sign, a no entry sign, a no motor vehicle sign, a wild animal sign, a cyclist sign, a pedestrian sign, a children sign, a sharp bend left or right sign, a double bend left or right sign, and a junction with or without priority sign.

If it is determined at step 58 that both the received vision data and navigation data includes the detected road traffic sign 14 then this is deemed to be a positive identification of the particular road sign. The processor 34 may check whether the relative position or distance from the vehicle 10 of the detected road traffic sign is consistent between the vision and navigation data to ensure that they refer to the same detected sign. In this case, at step 60 the output 36 sends a control signal to the display apparatus 38 to display an indication of the detected road traffic sign to the driver, or at least to display an indication of the information provided by the detected road traffic sign to the driver. That is, the output 36 is configured to transmit an indication of the detected road traffic sign to the driver.

If, however, it is determined at step 58 that the detected road traffic sign 14 is not included in both the received vision data and navigation data, then at step 62 the processor 34 determines which of the received vision data and navigation data includes the detected road traffic sign 14.

If at step 62 it is determined that the detected road traffic sign 14 is included in the received vision road traffic sign data only, then the processor 34 makes a further determination at step 64 as to whether the navigation subsystem 22 has access to data indicative of the particular detected road traffic sign 14. The navigation subsystem 22 may only store information relating to a subset of all of the different types of permanent traffic signs present on the road 12. If the navigation subsystem 22 does not store information on the locations of specific type of sign that the detected road traffic sign 14 has been determined to be, then the processor 34 therefore cannot check whether the navigation subsystem 22 has also detected this road traffic sign. In this case, at step 66 the output 36 automatically sends a control signal to the display apparatus 38 to display an indication of the detected road traffic sign 66.

If, however, the navigation subsystem 22 does store information on the specific type of sign that the detected road traffic sign 14 is determined to be, but the navigation subsystem 22 has simply not detected the road sign 14 (such that it is not included in the navigation road traffic sign data), then at step 68 the controller 30 does not control the display apparatus 38 to display an indication of the detected road traffic sign. This may occur either because the navigation subsystem 22 has not determined the sign detected by the vision subsystem 16 to be in the vehicle's vicinity. In this case, the detection of the road traffic sign 14 is determined to be a false positive detection by the vision subsystem 16 (step 68).

Returning to step 62, if it is determined that the detected road traffic sign 14 is included in the received navigation road traffic sign data only, then the processor 34 makes a determination of a further characteristic at step 70, in particular whether advance notification of the particular detected road traffic sign 14 is needed. Specifically, the processor 34 makes a determination as to whether the driver needs to be notified that the vehicle 10 is approaching the detected road traffic sign 14 further or earlier in advance of the notification provided by the preceding steps in the method 50.

The cameras 18 of the vision subsystem 16 may only have a limited range of vision ahead of the vehicle 10, for example approximately 30 metres. For certain types of road traffic sign, it would be beneficial for the vehicle driver to be informed of the information displayed on such a road traffic sign when the vehicle 10 is still further than 30 metres from the road traffic sign. That is, it would be beneficial for the driver to be made aware of an upcoming road traffic sign prior to it being detected by the vision subsystem 16. Such hazard or warning signs may include any of a stop sign, a yield sign, a pedestrian sign, and a children sign. Specifically, providing so-called 'advance notification' of certain signs provides a warning to the driver of a need to take action, e.g. reducing the vehicle speed, well in advance of reaching the traffic sign.

Expressed differently, if the detected road traffic sign 14 included in the navigation data provided by the navigation subsystem 22 needs to be notified to the driver outside a detection range of the vision subsystem 16 (step 70), i.e. greater than a threshold distance between the vehicle 10 and the detected road traffic sign 14, then at step 72 the output 36 commands the display apparatus 38 to display an indication of the second road traffic sign 14 to the driver.

Otherwise, at step 74 the output 36 does not transmit such an instruction, or withholds transmitting such a control signal, until the vehicle 10 is passing the detected road traffic sign 14, or at least until the distance between the vehicle 10 and the detected road traffic sign 14 is less than the threshold distance. By this point, the vision subsystem 16 also have detected the road traffic sign 14.

Returning to step 56 in the method 50, if the processor 34 instead classifies the detected road traffic sign 14 to be a temporary by nature, then at step 76 the output 36 automatically sends a control signal to the display apparatus 38 to display an indication of the detected road traffic sign 14. It will be understood that traffic signs that are temporary by nature will not be stored in a navigation system and so it is implicit that the detected sign 14 is included in the vision data. That is, information relating to the presence of temporary signs, for example during a limited period of construction works, will not be stored by the navigation subsystem 22 and will therefore not be detected. For this reason, unlike in the case where the detected road traffic sign 14 is permanent by nature, when the detected road traffic sign 14 is temporary by nature the processor 34 does not make an additional check to determine whether the sign has been detected by the navigational subsystem 22. Hence, in order to determine that the driver is suitably notified of upcoming temporary road traffic signs, only detection of a temporary sign by the vision subsystem 16 is needed before the controller 30 commands that the driver is to be informed at step 76.

Examples of road traffic signs that may be determined to be temporary in nature include a slippery road sign, a queues sign, a road narrows both directions sign, a road narrows left or right sign, and a construction or works sign.

The processor 34 may determine that a sign is temporary by nature with reference to its position/height relative to the road, its tilt, its size, and/or the particular information being displayed by the sign.

When the output 36 send the control signal to the display apparatus 38, the indication of the detected road traffic sign 14 may be displayed to the driver for a specified distance of travel of the vehicle 10. In the case of a speed limit sign, the detected road traffic sign 14 is always displayed to the driver, whereas other types of sign may be displayed to the driver until it is determined that the vehicle 10 has travelled past the sign on the road. Different types of hazard signs may be displayed to the driver for different periods of time or different distances of vehicle travel depending on the particular information being displayed by the traffic sign. For example, a road traffic hazard sign indicating a risk of falling rocks for the next mile may be displayed to the driver for a mile of vehicle travel after passing the sign.

It will be appreciated that various changes and modifications can be made to the present invention without departing from the scope of the present application.

In the above-described embodiment, the road traffic sign is on the road being travelled by the vehicle and ahead of the vehicle; however, in different embodiments, the road traffic sign may be anywhere in the vicinity of the vehicle. For example, the road traffic sign may be at the side of the road or on the road itself (e.g., in the case of a temporary road sign). The road traffic sign may be on a different road being approached by the vehicle, or on a road that the vehicle has now left. The vicinity of the vehicle may include a specified area or distance ahead of the vehicle or to the rear of the vehicle, whether on the road the vehicle is currently on or not. The vicinity of the vehicle may include a certain distance along (planned) route being travelled by the vehicle. The vicinity of the vehicle may include an area generally proximal to the vehicle.

The particular order of the method steps performed by the control system 40 in the above-described embodiment may be different in different embodiments. Furthermore, in different embodiments, only a subset of the above-described method steps may be performed.

In the above-described embodiment, when it is determined to output an indication of the detected road traffic sign, a control signal is sent to the display apparatus 38 to display the detected traffic sign, or at least information relating to the traffic sign, to the driver. In different embodiments, the output may instead or additionally transmit an indication of the detected road traffic sign to another subsystem, for example an intelligent cruise control function, of the vehicle 10 such that appropriate action may be taken.

In the above-described embodiment, in addition to the controller the control system includes the vision subsystem, navigation subsystem and display apparatus; however, in different embodiments, the control system may comprise only the one or more controllers, or a subset of the other recited subsystems, or additional subsystems.

The invention claimed is:

1. A control system for a vehicle, the control system comprising at least one controller including at least one processor, the control system being configured to:
   receive vision road traffic sign data from a vision subsystem of the vehicle;
   receive navigation road traffic sign data from a navigation subsystem of the vehicle;
   determine a characteristic of a detected road traffic sign in a vicinity of the vehicle, wherein data relating to the detected road traffic sign is included in at least one of the received vision road traffic sign data and the received navigation road traffic sign data; and
   determine whether to output an indication of the detected road traffic sign in dependence on the determined characteristic and in dependence on a determination of whether the data relating to the detected road traffic sign is included in:
      the vision road traffic sign data only,
      the navigation road traffic sign data only, or
      both the vision road traffic sign data and the navigation road traffic sign data.

2. The control system according to claim 1, wherein the characteristic is that the detected road traffic sign is either permanent or temporary.

3. The control system according to claim 2, wherein the control system is configured to output the indication of the detected road traffic sign based on the detected road traffic sign being permanent and included in both the vision road traffic sign data and the navigation road traffic sign data.

4. The control system according to claim 2, wherein the control system is configured to determine whether the navigation subsystem has access to data indicative of the detected road traffic sign and, if not, output the indication of the detected road traffic sign based on the detected road traffic sign being permanent and included in the vision road traffic sign data only.

5. The control system according to claim 2, wherein the control system is configured to output the indication of the detected road traffic sign based on the detected road traffic sign being temporary and included in the vision road traffic sign data.

6. The control system according to claim 1, wherein the characteristic is whether advance notification of the detected road traffic sign is needed.

7. The control system according to claim 6, wherein the control system is configured to output the indication of the detected road traffic sign based on advance notification of the detected road traffic sign being needed and the detected road traffic sign being included in the navigation road traffic sign data.

8. The control system according to claim 6, wherein the control system is configured to determine that advance notification is needed based on the indication of the detected road traffic sign needing to be output when a distance between the vehicle and the detected road traffic sign is greater than a threshold value.

9. The control system according to claim 1, wherein the control system is configured to output the indication of the detected road traffic sign to a driver of the vehicle.

10. The control system according to claim 9, wherein the control system is configured to cause the indication of the detected road traffic sign to be displayed for a specified distance of travel of the vehicle.

11. The control system according to claim 10, wherein the control system is configured to display the indication of the detected road traffic sign until the vehicle has passed the detected road traffic sign.

12. A vehicle comprising the control system according to claim 1.

13. A method comprising:
   receiving vision road traffic sign data from a vision subsystem of a vehicle;
   receiving navigation road traffic sign data from a navigation subsystem of the vehicle;
   determining a characteristic of a detected road traffic sign in a vicinity of the vehicle, wherein data relating to the detected road traffic sign is included in at least one of the received vision road traffic sign data and the received navigation road traffic sign data; and
   determining whether to output an indication of the detected road traffic sign in dependence on the determined characteristic and in dependence on a determination of whether the data relating to the detected road traffic sign is included in: the vision road traffic sign data only; the navigation road traffic sign data only; or both the vision road traffic sign data and the navigation road traffic sign data.

14. A non-transitory, computer-readable storage medium storing instructions that when executed by one or more electronic processors cause the one or more electronic processors to perform the method of claim 13.

* * * * *